United States Patent [19]
Borrel et al.

[11] Patent Number: 5,708,764
[45] Date of Patent: Jan. 13, 1998

[54] HOTLINKS BETWEEN AN ANNOTATION WINDOW AND GRAPHICS WINDOW FOR INTERACTIVE 3D GRAPHICS

[75] Inventors: Paul Borrel, Peekskill; Keh-Shin Fu Cheng, Mahopac; Jai Prakash Menon, Peekskill; Jaroslaw Roman Rossignac, Ossining, all of N.Y.

[73] Assignee: International Business Machines Corporation, Armonk, N.Y.

[21] Appl. No.: 716,816

[22] Filed: Sep. 10, 1996

Related U.S. Application Data

[63] Continuation of Ser. No. 410,370, Mar. 24, 1995, abandoned.
[51] Int. Cl.$^6$ .................................................. G06T 17/40
[52] U.S. Cl. ................ 395/119; 364/468.09; 364/468.1
[58] Field of Search ........................... 395/118–9, 127, 395/133; 364/427.24, 427.29, 578, 468.01, 468.03, 468.04, 463.09, 468.1

[56] References Cited

PUBLICATIONS

"Borland® Quattro® Pro for Windows—User's Guide", Ver. 5.0, Borland International, Inc., 1991, pp. 265–267 and 573–575.
IRIS Annotator (3–D Annotation with Digital Media Notes), Internet address: http://www.sgi.com/Products/Annotator.html.
M. Andreessen "NCSA Mosaic Technical Summary", NCSA Mosaic Tech. Summary 2.1, National Center for Superconducting Applications, 1993.
"A Beginner's Guide to HTML", National Center for Superconducting Applications, 1993.
IBM 3D Interaction Accelerator™ User's Guide Version 1 Release 1.1 pp. 65–72.

*Primary Examiner*—Joseph H. Feild
*Assistant Examiner*—Rudolph Buchel
*Attorney, Agent, or Firm*—Jay P. Sbrollini

[57] ABSTRACT

A computer graphics system includes a graphics processing engine for processing and displaying graphics data representing three-dimensional objects in a first portion of a display. A text processing engine displays text in a second portion of the display. Embedded in the text is a command or hotlink for controlling operation of the graphics processing engine. In response to user selection of first data displayed in the second portion of the display, a supervisory controller analyzes the first data to determine if the first data includes at least one hotlink command. Upon determining that the first data includes at least one hotlink command, the supervisory controller identifies the hotlink command included in the first data and controls operation of the graphics processing engine to perform at least one graphics function according to the hotlink command included in the first data. The graphics function may be associated with at least one of the three-dimensional objects, a three-dimensional markup, a predefined view point, or a predefined animation.

36 Claims, 10 Drawing Sheets

HOTLINKS BETWEEN AN ANNOTATION WINDOW AND GRAPHICS WINDOW FOR INTERACTIVE 3D GRAPHICS

This is a continuation of application Ser. No. 08/410,370, filed Mar. 24, 1995, now abandoned.

BACKGROUND OF THE INVENTION

1. Technical Field

The invention relates generally to computer graphics systems, and, more particularly, to computer graphics systems that generate, encapsulate, and traverse geometric and non-geometric information through user interactivity.

2. Description of the Related Art

Graphics systems store large amounts of data that represent three-dimensional objects and associated features. The data may be, for example, the position of each of the object's surfaces along a z-axis (depth), or color of each of the object's surfaces. The data is processed according to a view point that defines the visual point from which objects are to be displayed. The view point is utilized to display the objects on a two-dimensional screen typically by tracing a ray of light that passes from the view point through the screen as shown in FIG. 1.

Conventionally, interactive graphics applications perform view point control, and thus provide the ability to navigate through the scene of three-dimensional objects, through dialog with the user via keyboard commands and/or pull down menus, or through operation of navigation devices such as a Spaceball or mouse. Typically, various keyboard commands and/or buttons of the pull down menus and/or navigation device operations correspond to incremental adjustments of the view point. The incremental adjustments may include, for example, zoom out, zoom in, move right, move left, move up, or move down. Moreover, many graphics applications provide the user with the ability to store a sequence of preselected views, commonly called an animation. In such applications, other keyboard commands and/or buttons of the pull down menus and/or navigation device operations relate to controlling these animations, such as starting an animation, stopping an animation, or incrementally updating an animation to move to the next or previous view in the sequence.

In addition, interactive graphics applications conventionally provide for object selection utilizing a pick operation. Typically, the user uses a pointing device such as a mouse or light pen to position a cursor or picking window over a portion of the three dimensional scene and to make the desired selection. Graphics systems typically perform the picking operation by defining a picking aperture and traversing all the objects of the three dimensional scene to determine those objects that are intersected by the picking aperture. The user then may select one of the intersecting objects as the picked object. In the alternative, the intersecting objects may be depth sorted using conventional z-buffer techniques and the front most object selected as the picked object.

More recently, Silicon Graphics has released an interactive graphics application named IRIS Annotator which provides the user with the capability of creating three-dimensional markers and annotations that are associated with the objects of a three-dimensional model. The markers, which may be, for example, an arrow, pin or bullet, may be placed at points of interest in the model. The annotations may include digital media such as text, audio, images, video, or other three-dimensional models. The annotations are created and imported into the model as an icon alongside the marker associated with the specific annotation. Moreover, the user may associate a preferred view of the model with each marker to facilitate view point control.

In the graphics applications described above, interactivity between the user and the application requires that the user be proficient with the operation of conventional input devices (for example, pointing and clicking a mouse) and also have knowledge of the specific scheme for issuing commands provided by the graphics application (for example, pulling down a menu to change the view point). For user's who lack these necessary skills, acquiring the skills may be a time consuming and difficult task. Moreover, because some users may not have the time, energy and determination to learn these skills, the user base for such applications may be limited.

Moreover, in typical design and manufacturing activities, there is a need to append non-geometric information to three-dimensional models of products under development. This information may be in the form of text that describes, for example, engineering changes pertaining to a design iteration. In this area, there is a need for tight coupling between the non-geometric information and the geometric three-dimensional models to facilitate communication among those involved in the development of the product including engineers, designers, manufacturing personnel, managers, technical staff, marketing, and others.

SUMMARY OF THE INVENTION

It is an object of the present invention to simplify the interactive operations between the user and computer graphics applications directed to, for example, generation, encapsulation, presentations, and traversal of geometric and non-geometric information for engineering design and manufacturing.

It is another object of the present invention to provide association between annotations and navigation through a three-dimensional scene.

It is yet another object of the present invention to provide association between annotations and view point control.

It is yet another object of the present invention to provide association between annotations and animation control.

It is yet another object of the present invention to provide association between annotations and the selection and display of objects of a three-dimensional scene.

It is yet another object of the present invention to provide association between annotations and the selection and display of three-dimensional markups of a three-dimensional scene.

According to the present invention, a computer graphics system includes: a graphics processing engine for processing and displaying graphics data representing three-dimensional objects in a first portion of a display; a text processing engine for entering text according to user input and for displaying the text in a second portion of the display, wherein portions of the text represents a command for controlling operation of the graphics processing engine; and a supervisory controller for controlling the graphics processing engine to perform at least one graphics function according to the command in response to a user selection of said portion of text displayed in the first portion of the display. The graphics function may concern at least one of the three-dimensional objects, a three-dimensional markup, a predefined view point, or a predefined animation.

By providing the user with the capability of performing graphics functions by selecting displayed text, the graphics system of the present invention provides an efficient, user friendly interface that requires minimal training and knowledge of the system. Moreover, the efficient user interface provided by the present invention is suitable for use in design and manufacturing activities wherein there is a need for tight coupling between the non-geometric information and the geometric three-dimensional models to facilitate communication among those involved in the development of products.

DETAILED DESCRIPTION OF THE PREFERRED EMBODIMENTS

Figure 1:
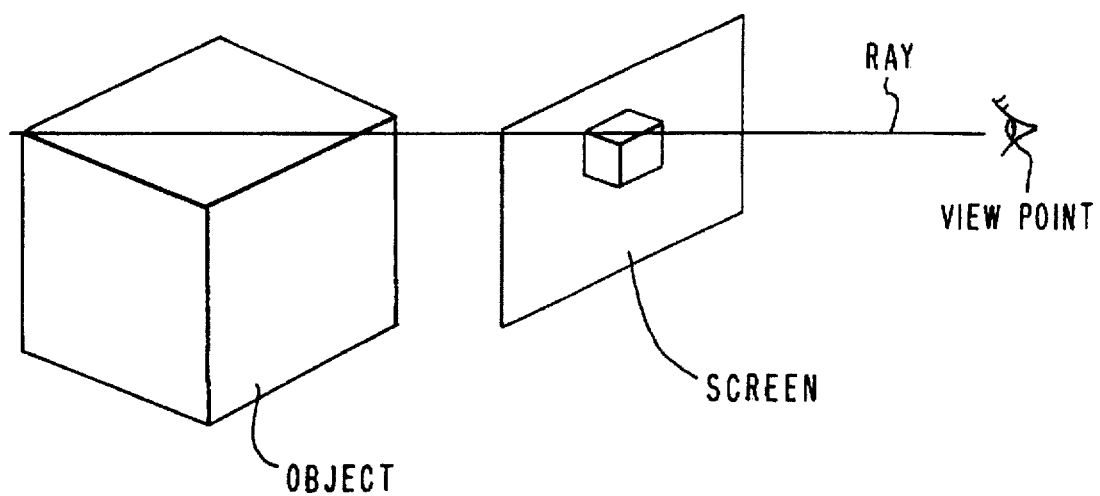
FIG. 1 is a pictorial representation of a method utilized by a graphics system to display a three-dimensional object on a two-dimensional screen.
Figure 2:
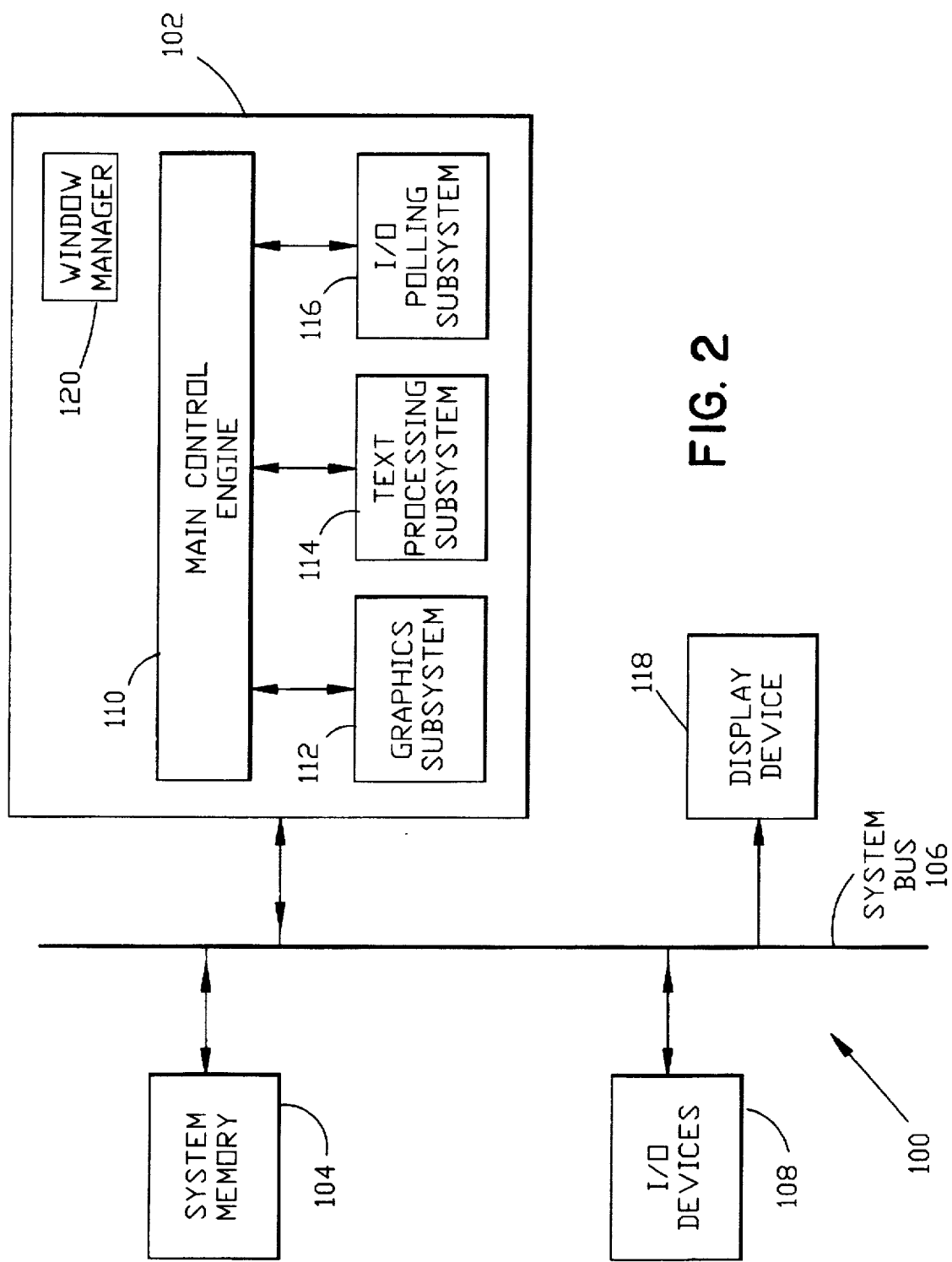
FIG. 2 is a functional block diagram of the architecture of the graphics system of the present invention.

The overall architecture of the present invention is depicted in FIG. 2. A graphics system 100 includes a host processor 102 which is coupled to a system memory 104 via a system bus 106. The system memory 104 consists of a random access memory that stores graphics data defining the objects contained in one or more three dimensional models. The graphics data that defines each object consists of coordinates and attributes (e.g. color) of primitives. The primitives are geometric entities such as a solid, line or surface. Typically, the primitives are triangles defined by a set of three vertices. In this case, the system memory 104 preferably includes a hierarchical data structure that includes: an ordered list of the vertices of each triangle, and an array (or similar data structure such as a linked list) that lists the triangles associated with each object of the three dimensional scene. In addition, the system memory 104 may include an array (or similar data structure such as a linked list) that associates one or more predefined view points with one or more of the objects, and may also include an array of animations (or similar data structure such as a linked list) that associates a list of predefined view points with one or more of the objects.

Moreover, the system memory 104 may store data that defines three-dimensional markups that are associated with one or more objects of the three-dimensional scene. The graphics data that defines each markup may consist of coordinates and attributes (e.g. color) of primitives or may consist of icons or bitmaps placed in three-dimensions. The primitives that define the markups may be triangles defined by a set of three vertices and edges defined by a set of two vertices. In this case, the system memory 104 preferably includes an array (or similar data structure such as a linked list) that list the triangles or edges that represent each markup of the three dimensional scene. Moreover, the system memory 104 may also include an array (or similar data structure such as a linked list) that associates the markups to one or more objects of the three dimensional scene, another array (or similar data structure such as a linked list) that associates the markups to predefined view points, and another array (or similar data structure such as a linked list) that associates the markups to predefined animations.

Input/output (I/O) devices 108 interface to the host processor 102 via the system bus 106. The I/O devices 108 may include a keyboard, template or touch pad for text entry, a pointing device such as a mouse, trackball, spaceball or light pen for user input, speech recognition for speech input, a speaker for audio output, a pen/tablet for handwriting recognition of hand-written input, and a video camera for video input.

The environment of the host processor 102 includes a main control engine 110 that interfaces to a graphics subsystem 112, a text processing subsystem 114, and an I/O polling subsystem 116. The graphics subsystem 112 may be part of the host processor 102 (as shown), or part of a co-processor integrated with the host processor 102. The graphics subsystem 112 interfaces to the system memory 104 via the system bus 106 and operates to render the graphics data stored in the system memory 104 for display as an array of pixels on a portion of a display area of a display device 118. The display device 118 may utilize raster scan techniques or liquid crystal display techniques to display the pixels. The text processing subsystem 114 operates to create and display text or other symbolic data, such an icon, on a portion of the display area of the display device 118. The I/O polling subsystem 116 periodically polls the I/O devices 108 for user input, and upon detecting a particular user input, transfers data that identifies the particular user input to the main control engine 110. The main control engine 110 controls the graphics subsystem 112 and text processing subsystem 114 according to the user input data received from the I/O polling subsystem 116.

Preferably, the environment of the host processor 102 also includes a window manager 120 that provides the user with the ability to create multiple display windows on the display area of the display device 118, wherein each window is associated with a specific task, also commonly called a thread. In this case, the window manager 120 may be utilized to dedicate at least one window for displaying the three-dimensional scene rendered by the graphics subsystem 112, and dedicate a separate window for displaying the text generated by the text processing subsystem 114. Moreover, these windows may be displayed side by side or overlap.

Figure 3:
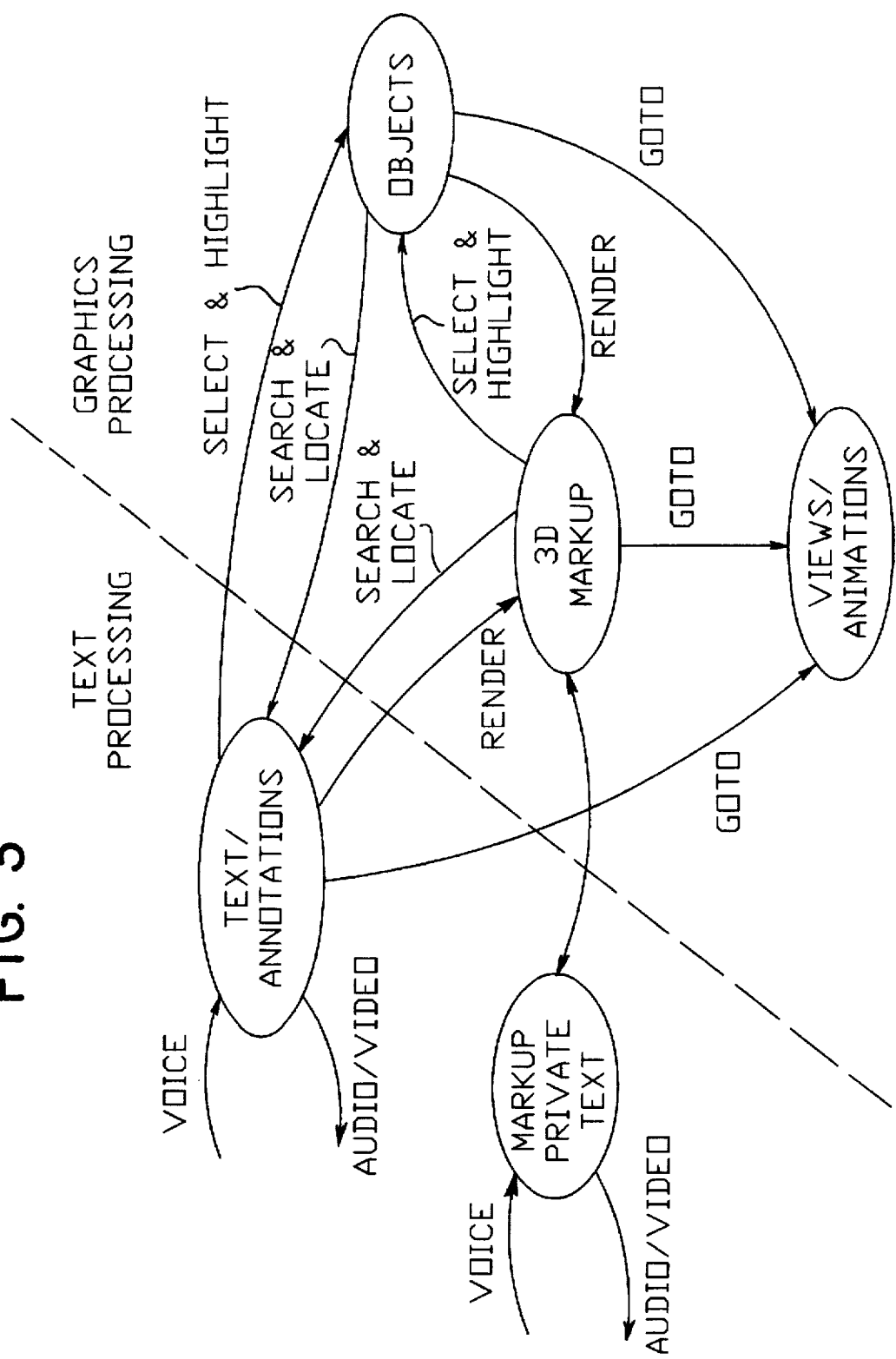
FIG. 3 is a pictorial representation of the command paths that couple the text processing subsystem to the graphics subsystem according to the present invention.

According to the present invention, user input commands or hotlinks that are created and subsequently selected in the text processing subsystem 114 are coupled to the graphics subsystem 112 to control operation therein. As illustrated in FIG. 3, the hotlinks may be associated with predefined views or animations stored in the system memory 104, with three-dimensional markups stored in the system memory 104, or with one or more of the objects that define the three-dimensional scene. A more detailed description of each command path illustrated in FIG. 3 is set forth below.

Figure 4:
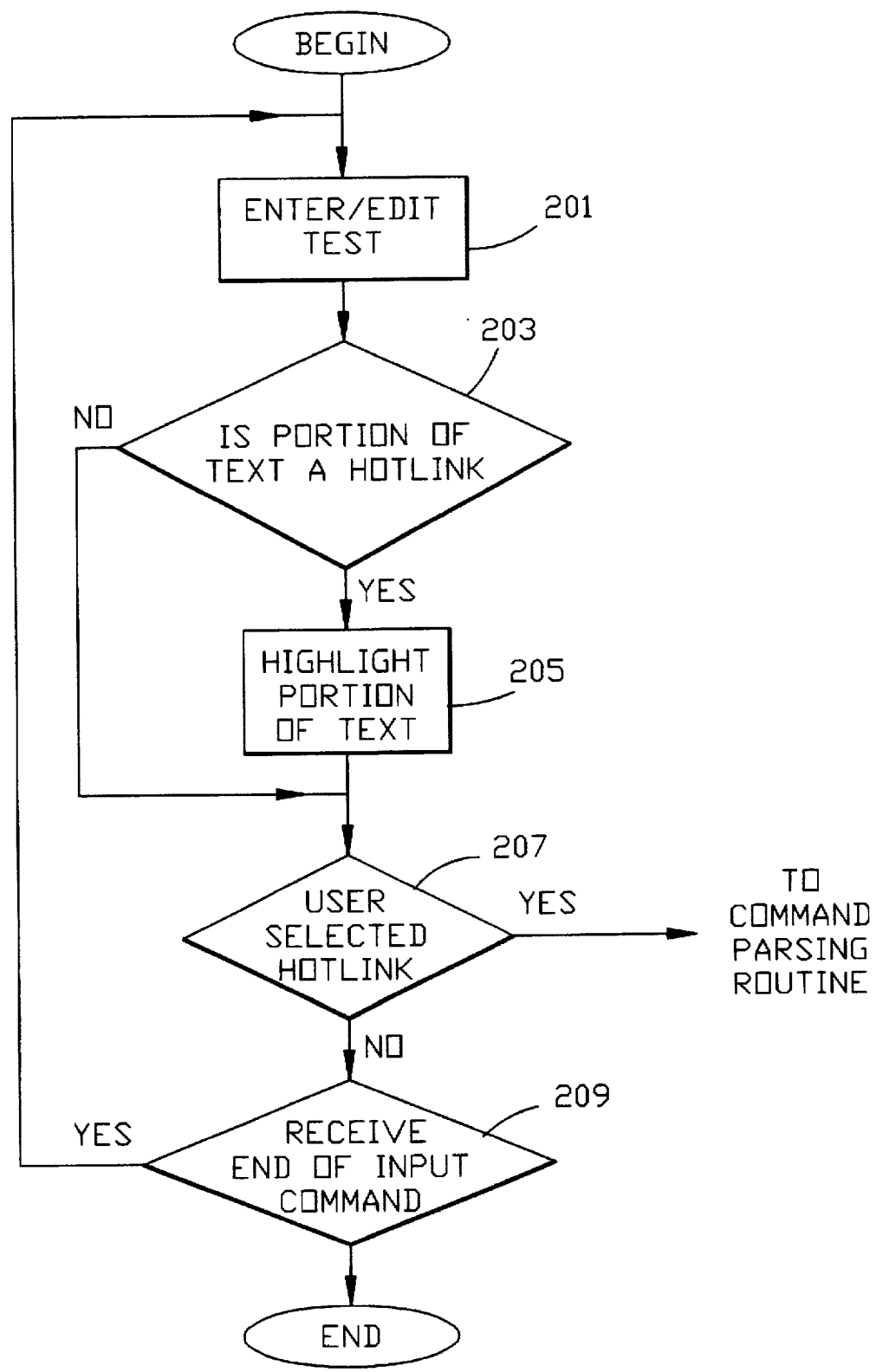
FIG. 4 is a flow chart illustrating a routine performed by the text processing subsystem to create, edit and/or use an annotation according to the present invention.

FIG. 4 illustrates the operation of the text processing subsystem 114 in creating and manipulating hotlinks associated with the views, animations, objects and three-dimensional markups stored in the system memory 104. It is assumed that the current three-dimensional scene (or model) is being displayed in a graphics window of the display area of the display device 118. In step 201, the user enters or edits text via I/O devices 108 which is displayed in an annotation window of the display device 118 by the window manager 120. The user may enter the text by a keyboard or through specific voice commands to a speech recognition system. The annotation window may be alongside or may overlay the graphics window. In step 203, the text processing subsystem 114 determines if a portion of the text represents a hotlink. Conventionally, during entry and edit, text is represented as a sequence of ASCII codes. In this case, a specific ASCII code or set of ASCII codes may be used to indicate the presence of a hotlink in a text document. For example, the ASCII codes for "<<" and ">>" embedded in a text string (i.e. <<V3>>) may indicate the presence of a hotlink. Thus, to determine if a portion of the text represents a hotlink, the text processing subsystem 114 analyzes the ASCII codes of the text searching for a match. Other semantics for encoding and decoding the hotlinks are available such as the HyperText Markup Language (HTML) standard as described in "A Beginner's Guide to HTML", dated 1993 by the National Center for Supercomputing Applications, available from marca@ncsa.uiuc.edu on the Internet, hereinafter incorporated by reference in its entirety.

If in step 203 the text processing subsystem 114 determines that a portion of the text is a hotlink, in step 205, the text processing subsystem 114 may highlight the portion of the text that represents the hotlink and then continue to step 207. Otherwise, the text processing subsystem 114 may bypass step 205 and continue directly to step 207. In step 207, the text processing subsystem 114 determines if the user has selected a hotlink. The user may select a hotlink, for example, by clicking on the relevant text or by invoking a specific keyboard command or by using speech input for voice activated commands. In this case, the text string selected via user input is transferred to the text processing subsystem 114 wherein it is parsed to determine if it represents a hotlink. The parsing may be accomplished as described above with respect to step 203. In another example, conventional text traversing techniques may be utilized to step through and invoke specific hotlinks (e.g., sequential presses of the F1 key steps through all of the <<V#>> hotlinks while the F2 key steps through all of the <<M#>> hotlinks, wherein the hotlink representations <<V#>> and <<M#>> are discussed below in greater detail).

If in step 207, the text processing subsystem 114 determines that the selected text string represents a hotlink, the selected text string is output to the main control engine 110 to perform the command parsing routine as described below with respect to FIG. 5. However, if in step 207 the text processing subsystem 114 determines the selected text is not a hotlink, operation continues to step 209 wherein the text processing subsystem 114 checks whether it has received a end of input command. If so, the annotation window is closed and the operation of the text processing subsystem 114 ended. Otherwise, operation returns back to step 201.

Figure 5:
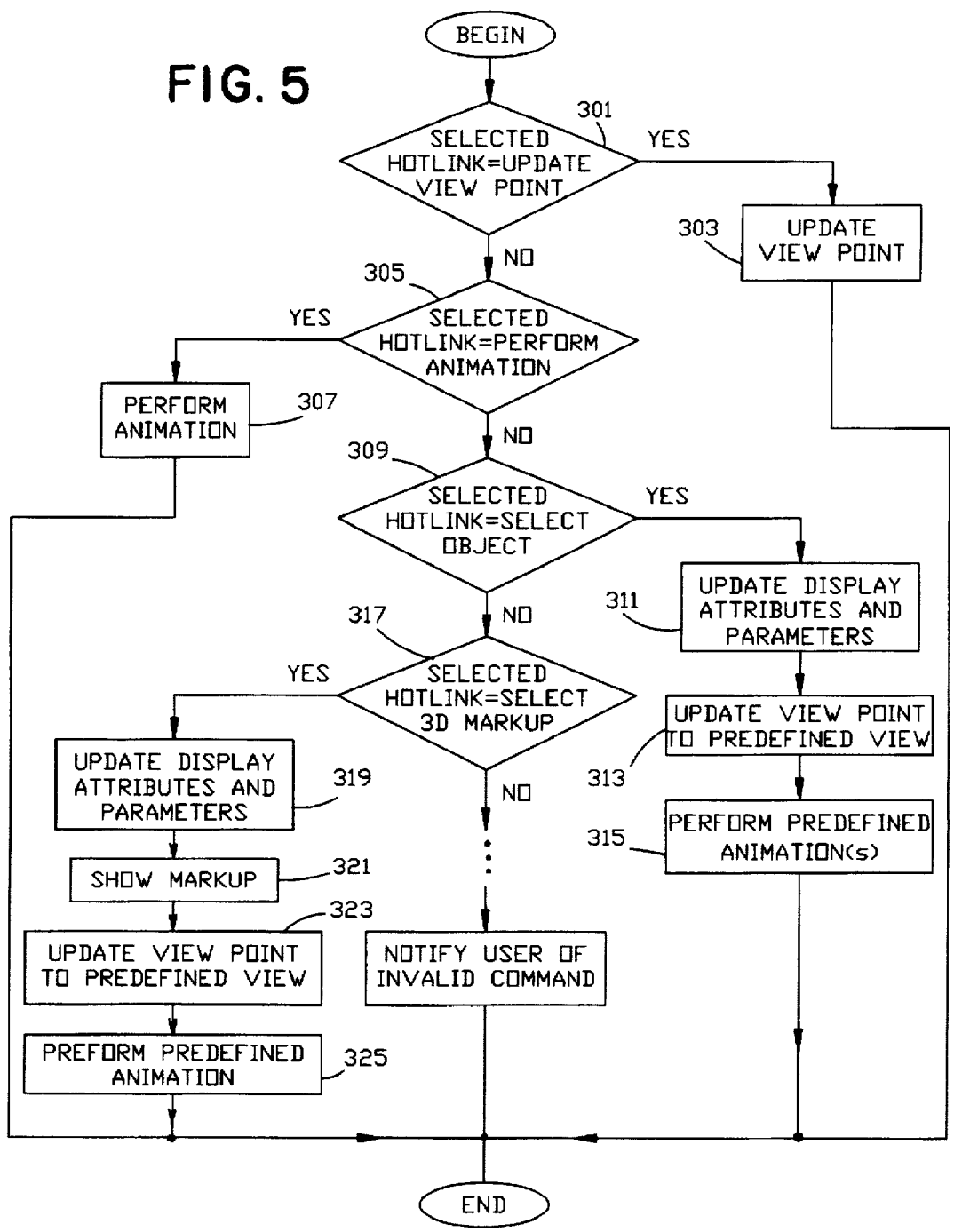
FIG. 5 is a flow chart illustrating a command parsing routine performed by the main control engine according to the present invention.

FIG. 5 illustrates the operation of the main control engine 110 in performing the command parsing routine according to the present invention. Preferably, the text strings representing the hotlink commands illustrated in FIG. 3 utilize the following formats: the hotlink command associated with a predefined view point stored in the system memory 104 is in the form <<V#>>, wherein # identifies the predefined view point; the hotlink command associated with a predefined animation point stored in the system memory 104 is in the form <<A#>>, wherein # identifies the predefined animation; the hotlink command associated with a three-dimensional markup stored in the system memory 104 is in the form <<M#>>, wherein # identifies the markup; and the hotlink command associated with one or objects of the three-dimensional scene is in the form <<S#>>, wherein # identifies the set of objects. Upon receiving the selected hotlink text string transferred from the text processing subsystem 114, the main control engine 110, in step 301 determines if the selected hotlink text string is associated with a predefined view point. For example, in the preferred embodiment, this may be accomplished by parsing the selected text string to check if it has a format <<V#>>. If in step 301 the main control engine 110 determines that the selected hotlink text string is associated with a predefined view point, operation continues to step 303 wherein the main control engine 110 controls the graphics subsystem 112 to update the view point of the scene (model) as displayed in the graphics window of the display device 118 to correspond to the predefined view point represented by the selected hotlink text string, or to compute a new view point based upon an increment associated with the selected hotlink text string. However, if in step 301 the main control engine 110 determines that the selected hotlink text string is not associated with a predefined view point, operation continues to step 305 wherein the main control engine 110 determines if the selected hotlink text string is associated with a predefined animation. If in step 305 the main control engine 110 determines that the selected hotlink text string is associated with a predefined animation, operation continues to step 307 wherein the main control engine 110 controls the graphics subsystem 112 to perform in the graphics window of the display device 118 the predefined animation represented by the selected hotlink text string. However, if in step 301 the main control engine 110 determines that the selected hotlink text string is not associated with a predefined animation, operation continues to step 309.

In step 309, the main control engine 110 determines if the selected hotlink text string is associated with one or more objects of the three-dimensional scene (model). If in step 309 the main control engine 110 determines that the selected hotlink text string is associated with one or more objects, operation continues to perform one or more of steps 311 to 315 and then ends.

In step 311, the main control engine 110 may update the display parameters and/or attributes associated with the objects of the scene. For example, the main control engine 110 may update the display attributes, such as color, of all objects not associated with the selected hotlink text string to make them hidden, thus controlling the graphics subsystem 112 to display only those objects associated with the selected hotlink text string in the graphics window of the display device 118. Moreover, the main control engine 110 may update display parameters to correspond to the those objects associated with the selected hotlink text string. For example, the main control engine 110 may update the center of rotation of the scene (model) to correspond to the geometric center of the objects associated with the selected hotlink text string for subsequent processing, or may align the vertical axis of the objects associated with the selected hotlink text string with a preferred direction.

In step 313, the main control engine 110 may control the graphics subsystem 112 to update the view point of the scene (model) as displayed in the graphics window of the display device 118 to correspond to a predefined view point linked with the one or more objects associated with the selected hotlink text string or to compute a new view point based upon an increment linked with the one or more objects associated with the selected hotlink text string.

And in step 315, the main control engine 110 may control the graphics subsystem 112 to perform in the graphics window of the display device 118 a predefined animation linked with the one or more objects associated with the selected hotlink text string.

If in step 309, the main control engine 110 determines that the selected hotlink text string is not associated with one or more objects, operation continues to step 317 wherein the main control engine 110 determines if the selected hotlink text string is associated with a three-dimensional markup. If in step 317 the main control engine 110 determines that the selected hotlink text string is associated with a three dimensional markup, operation continues to perform one or more of steps 319 to 325 and then ends.

In step 319, the main control engine 110 may update the display parameters and/or attributes associated with the objects of the three dimensional scene (model). For example, the main control engine 110 may update the display attributes, such as color, of all objects not linked to the markup associated with the selected hotlink text string to make them hidden, thus controlling the graphics subsystem 112 to display only those objects linked to the markup associated with the selected hotlink text string in the graphics window of the display device 118. Moreover, the main control engine 110 may update display parameters to correspond to the objects linked to the markup associated with the selected hotlink text string. For example, the main control engine 110 may update the center of rotation of the scene (model) to correspond to the geometric center of the objects linked to the markup associated with the selected hotlink text string for subsequent processing, or may align the vertical axis of the objects linked to the markup associated with the selected hotlink text string with a preferred direction.

In step 321, the main control engine may control the graphics subsystem 112 to show the markup in the graphics window of the display device 118.

In step 323, the main control engine 110 may control the graphics subsystem 112 to update the view point of the scene (model) as displayed in the graphics window of the display device 118 to correspond to a predefined view point linked to the markup associated with the selected hotlink text string, or to compute a new view point based upon an increment link to the markup associated with the selected hotlink text string.

And in step 325, the main control engine 110 may control the graphics subsystem 112 to perform in the graphics window of the display device 118 a predefined animation linked with the markup associated with the selected hotlink text string.

If in step 317, the main control engine 110 determines that the selected hotlink text string is not associated with one or more markups, operation may continue to parse other hotlink commands. For example, the other hotlink commands may change the lighting conditions of the scene, change the shadow parameters, change the simplification (i.e. level of detail) of the objects to be rendered or other graphics processing functions. Other hotlink commands may include display of associated static bitmapped images or the playback of audio or video segments. In step 317, if the selected hotlink text string does not correspond to any valid commands, then the user is notified of an invalid command and operation ends.

Figure 6:
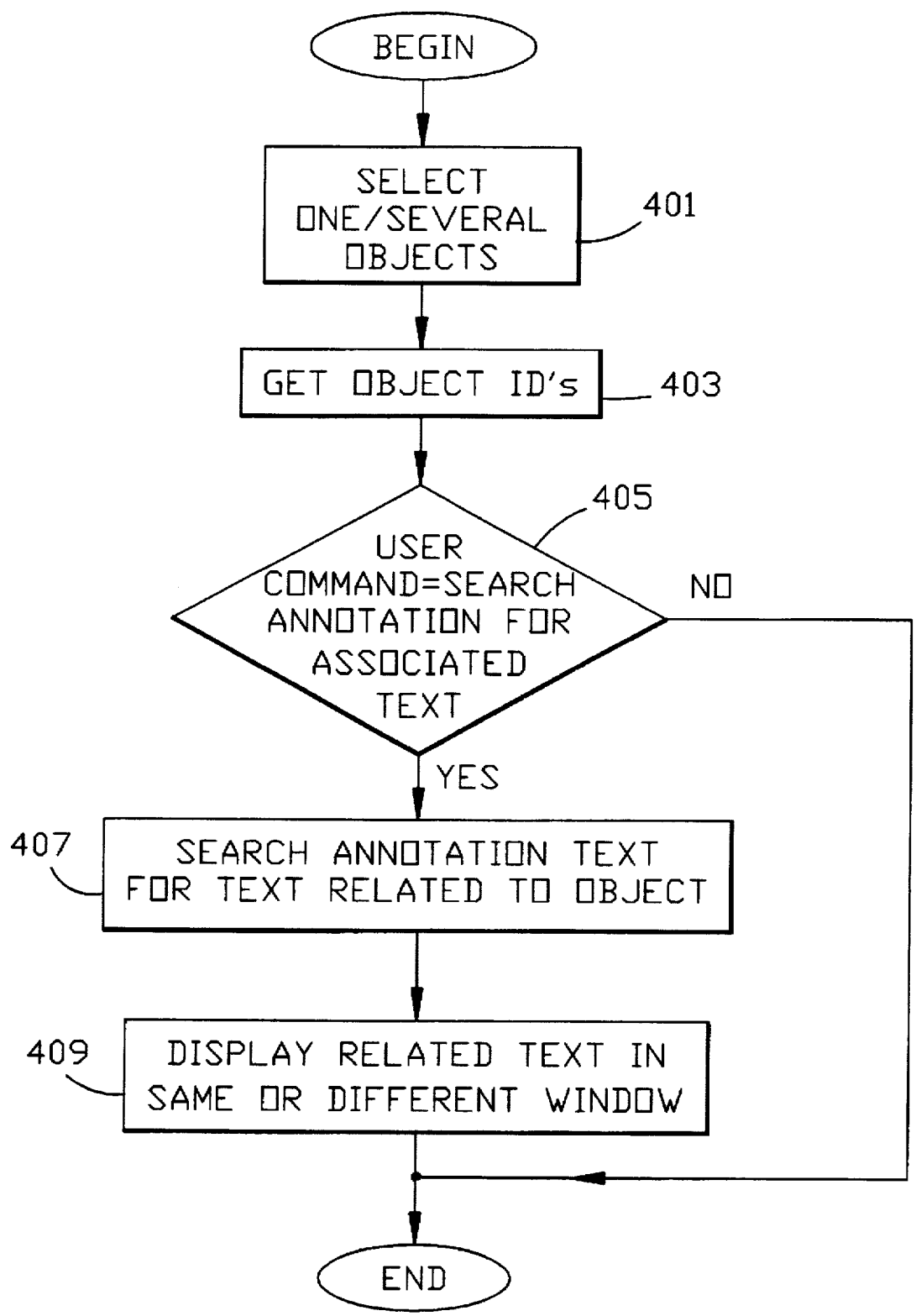
FIG. 6 is a flow chart illustrating operation of the graphics subsystem, main control engine, and text processing subsystem in providing the user with the ability to search and highlight portions of the text displayed in an annotation window that are associated with one or more selected objects.

In addition to hotlink commands that link the annotation window to the graphics functions performed by the graphics subsystem 112 on objects that are displayed in the graphics window of the display device 118, commands may be created that link the objects to text processing functions performed by the text processing subsystem 114 on the text that is displayed in the annotation window. For example, FIG. 6 illustrates the operation of the graphics subsystem 112, main control engine 110, and text processing subsystem 114 in providing the user with the ability to search and highlight portions of the text displayed in the annotation window of the display device 118 that are associated with one or more selected objects. In step 401, the user selects one or more objects displayed in the graphics window of the display device 118 using conventional picking techniques. Picking is described in such references as U.S. Pat. No. 4,847,605 to Callahan et al.; U.S. Pat. No. 4,870,599 to Hempel et al.; U.S. Pat. No. 5,255,359 to Ebbers et al.; and U.S. Pat. No. 5,373,514 to Lawless et al., all assigned to the assignee of the present invention and hereinafter incorporated by reference in their entirety. In step 403, the main control engine 110 retrieves the object identifiers that correspond to the one or more selected objects as determined by the picking operation. In step 405, the main control engine 110 checks whether the user has issued a command to search the annotation window for text related to the retrieved object identifiers. The user may issue such a command may be, for example, by pressing the SPACEBAR on a keyboard. If not, the operation ends. However, if in step 405 the main control engine 110 determines that the user has issued a command to search the annotation window for text related to the retrieved object identifiers, in step 407 the main control engine 110 controls the text processing subsystem 114 to search the annotation window for text related to the retrieved object identifiers, and in step 409, the text processing subsystem 114 may highlight and display text related to the retrieved object identifiers in the annotation window of the display device 118 or in a separate window of the display device 118. The text processing subsystem 114 may perform a context based search, for example, utilizing an inference engine, to locate the text related to the retrieved object identifiers.

As described above, the object selection steps 401 and 403 precede the user command input step 405. However, this may be modified such that the object selection steps 401 and 403 are performed subsequent to the user command input step 405. In this case, if the main control engine 110 determines that the user has issued a command to search the annotation window for text related to the selected objects, the main control engine 110 may subsequently control the text processing subsystem 114 to search the annotation window for text related to retrieved object identifiers, and the text processing subsystem 114 may subsequently highlight and display text related to the retrieved object identifiers in the annotation window of the display device 118 or in a separate window of the display device 118.

Figure 7:
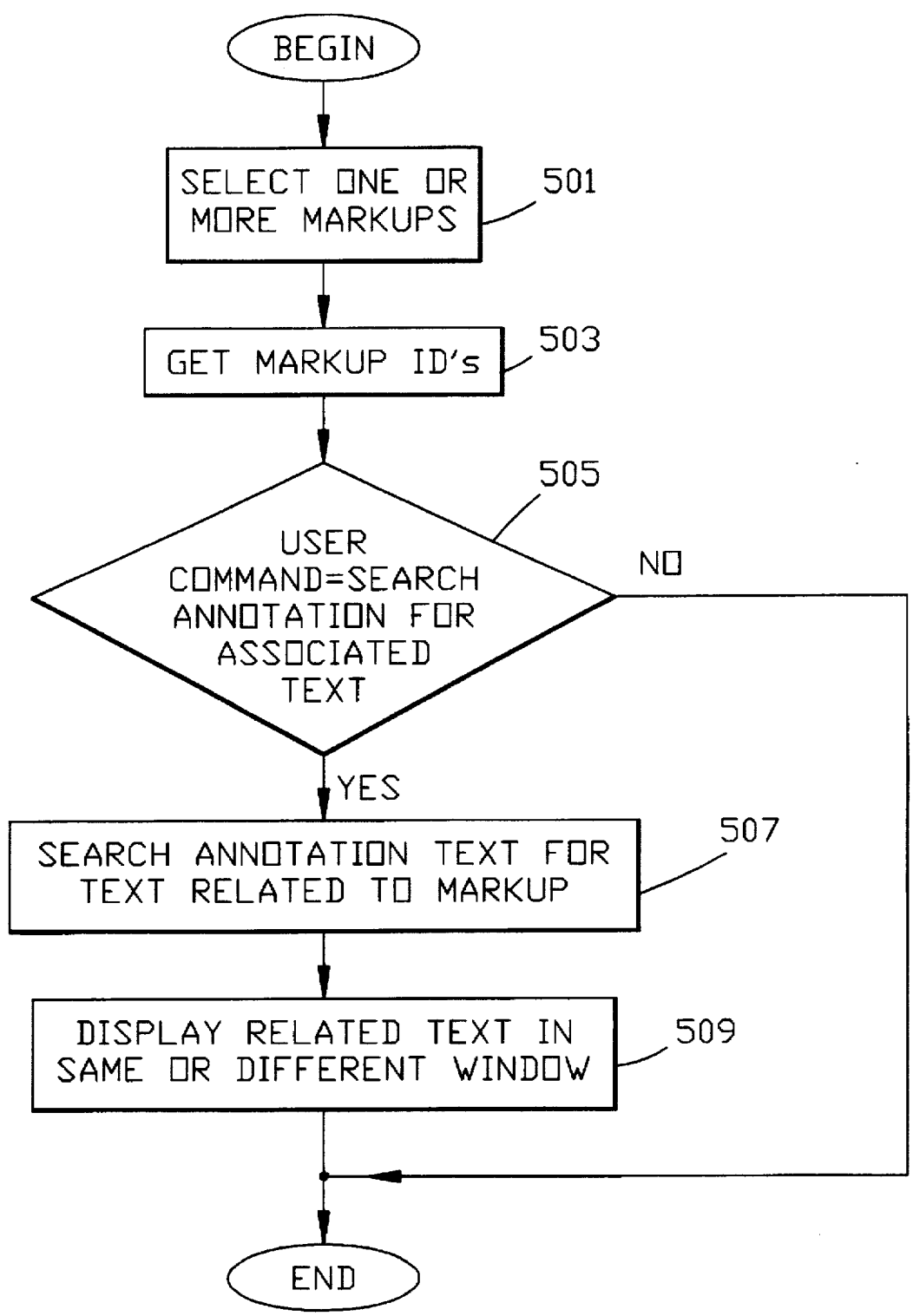
FIG. 7 is a flow chart illustrating operation of the graphics subsystem, main control engine, and text processing subsystem in providing the user with the ability to search and highlight portions of the text displayed in the annotation window that are associated with one or more selected markups.

In addition, commands may be created that link the markups to text processing functions performed by the text processing subsystem 114 on the text that is displayed in the annotation window. For example, FIG. 7 illustrates the operation of the graphics subsystem 112, main control engine 110, and text processing subsystem 114 in providing the user with the ability to search and highlight portions of the text displayed in the annotation window of the display device 118 that are associated with one or more selected markups. In step 501, the user selects one or more markups displayed in the graphics window of the display device 118 using conventional picking techniques as described above. In the alternative, slight modifications may be made to the conventional picking techniques. For example, the graphics subsystem 112 may pick the markup whose projection on the graphics window of the display device 118 is closest to the pick aperture. In step 503, the main control engine 110 retrieves the markup identifiers that correspond to the one or more selected markups as determined by the picking operation. In step 505, the main control engine 110 checks whether the user has issued a command to search the annotation window for text related to the retrieved markup identifiers. The user may issue such a command may be, for example, by pressing the SPACEBAR on a keyboard. If not, the operation ends. However, if in step 505 the main control engine 110 determines that the user has issued a command to search the annotation window for text related to the retrieved markup identifiers, in step 507 the main control engine 110 controls the text processing subsystem 114 to search the annotation window for text related to the retrieved markup identifiers, and in step 509, the text processing subsystem 114 may highlight and display text related to the retrieved markup identifiers in the annotation window of the display device 118 or in a separate window of the display device 118.

As described above, the markup selection steps 501 and 503 precede the user command input step 505. However, this may be modified such that the markup selection steps 501 and 503 are performed subsequent to the user command input step 505. In this case, if the main control engine 110 determines that the user has issued a command to search the annotation window for text related to the selected markups, the main control engine 110 may subsequently control the text processing subsystem 114 to search the annotation window for text related to retrieved markup identifiers, and the text processing subsystem 114 may subsequently highlight and display text related to the retrieved markup identifiers in the annotation window of the display device 118 or in a separate window of the display device 118. The text processing subsystem 114 may perform a context based search, for example, utilizing an inference engine, to locate the text related to the retrieved markup identifiers.

Figure 8:
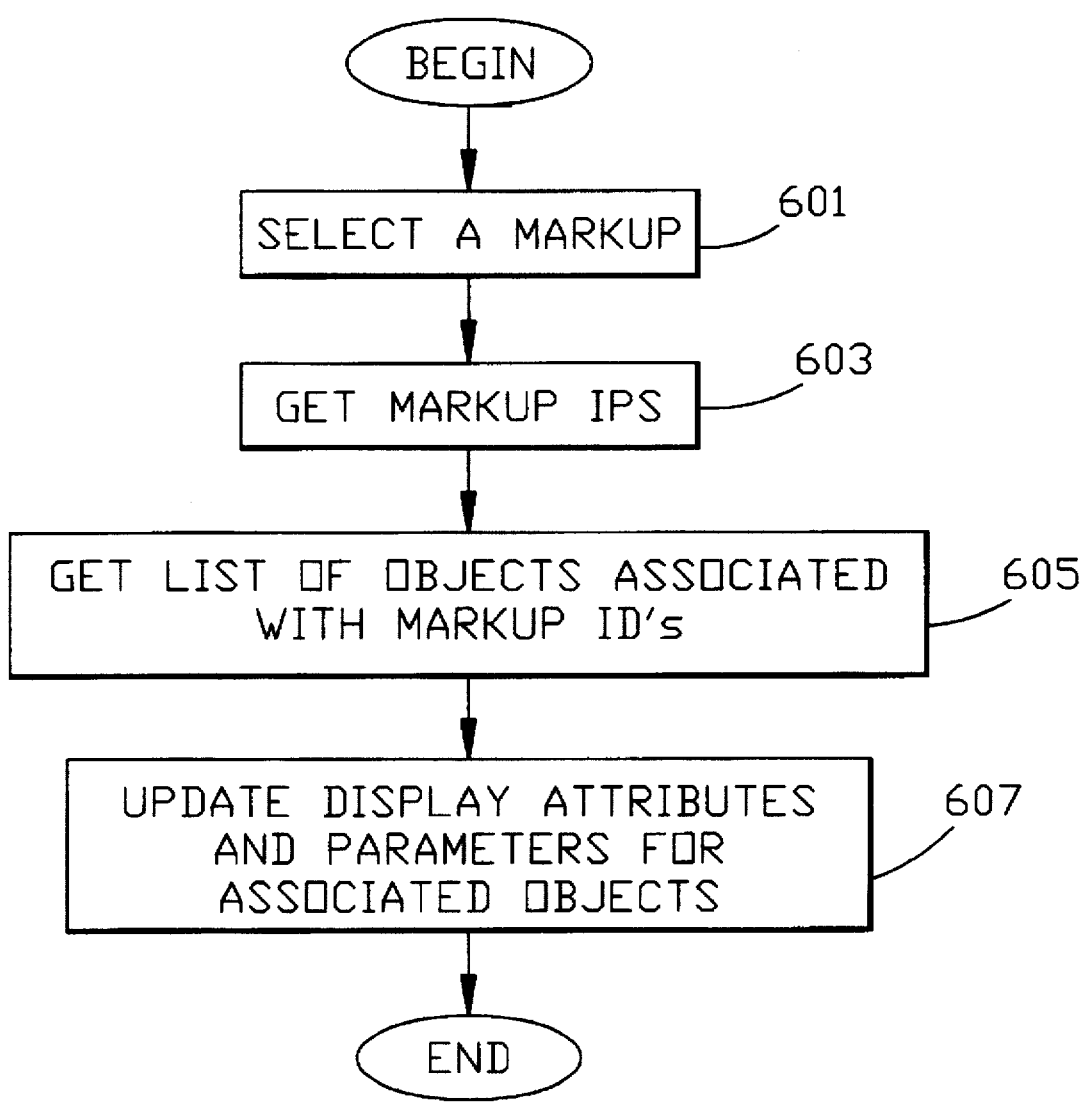
FIG. 8 is a flow chart illustrating operation of the main control engine and graphics subsystem in providing the user with the ability to update the display attributes of one or more objects displayed in the graphics window that are associated with one or more selected markups.

Having described the hotlinks and/or user input commands that couple the text processing subsystem 114 to the graphics subsystem 112, commands may be implemented that couple the graphics functions associated with the objects and three-dimensional markups, respectively. For example, FIG. 8 illustrates the operation of the main control engine 110 and graphics subsystem 112 in providing the user with the ability to update the display attributes of one or more objects displayed in the graphics window of the display device 118 that are associated with one or more selected markups. In step 601, the user selects one or more markups displayed in the graphics window of the display device 118 using conventional picking techniques as described above. In the alternative, slight modifications may be made to the conventional picking techniques. For example, the graphics subsystem 112 may pick the markup whose projection on the graphics window of the display device 118 is closest to the pick aperture. In step 603, the main control engine 110 retrieves the markup identifiers that correspond to the one or more selected markups as determined by the picking operation. In step 605, the main control engine 110, utilizing the graphics data stored the memory system 104, generates a list of objects that are associated with the selected markups. In step 607, the main control engine 110 may update the display parameters and/or attributes associated with the objects of the three dimensional scene (model). For example, the main control engine 110 may update the display attributes, such as color, of all objects not linked to the markup to make them hidden, thus controlling the graphics subsystem 112 to display only those objects linked to the markup. Moreover, the main control engine 110 may update display parameters to correspond to the objects linked to the markup. For example, the main control engine 110 may update the center of rotation of the scene (model) to correspond to the geometric center of the objects linked to the markup, or may align the vertical axis of the objects linked to the markup with a preferred direction.

Figure 9:
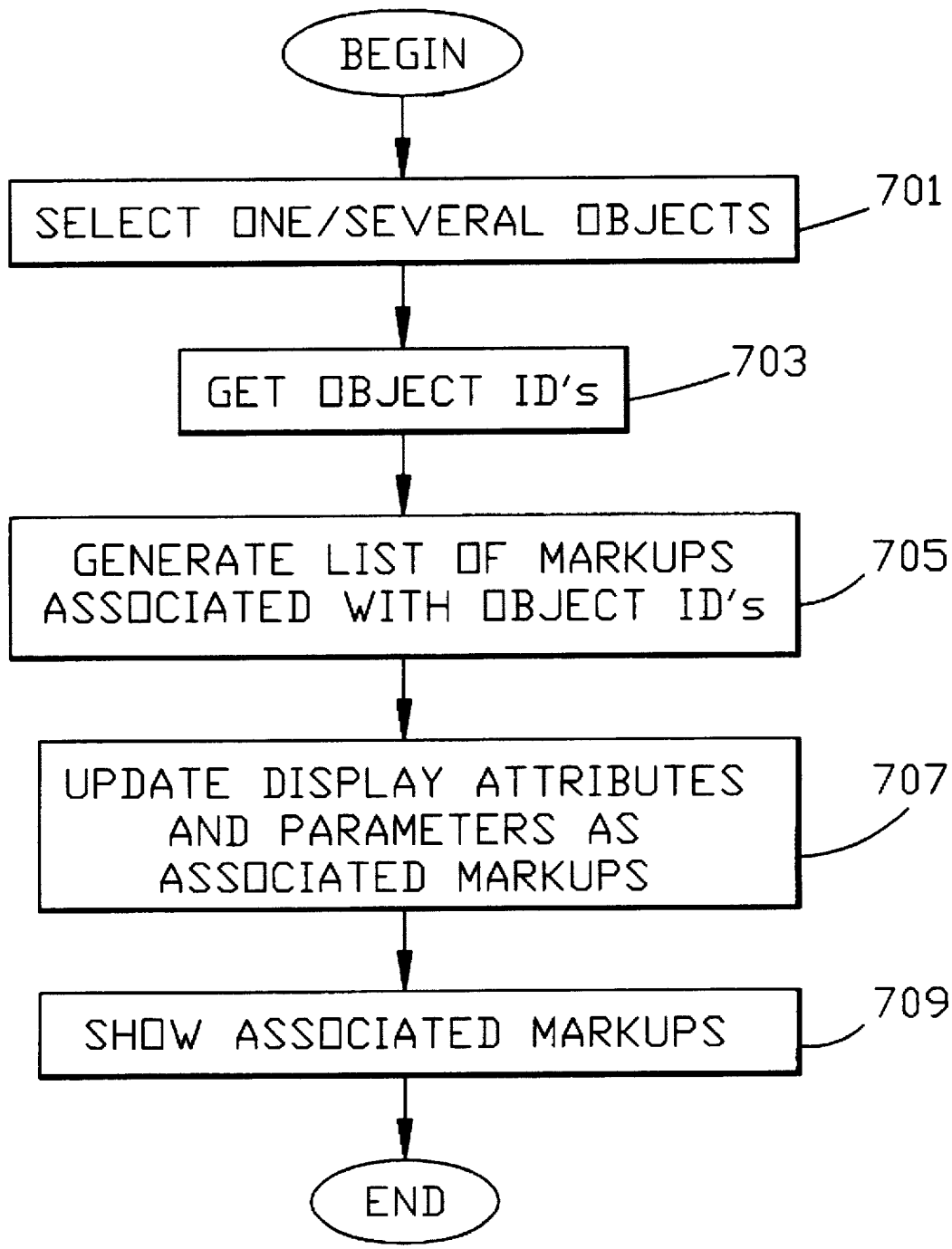
FIG. 9 is a flow chart illustrating operation of the main control engine and graphics subsystem in providing the user with the ability to update the display attributes associated with one or more markups and/or display the one or more markups in the graphics window for those markups that are associated with one or more selected objects.

Another example of a command that links the graphics functions associated with the objects and three-dimensional markups is shown in FIG. 9. More specifically, FIG. 9 illustrates the operation of the main control engine 110 and graphics subsystem 112 in providing the user with the ability to update the display attributes associated with one or more markups and/or display the one or more markups in the graphics window of the display device 118 for those markups that are associated with one or more selected objects. In step 701, the user selects one or more objects displayed in the graphics window of the display device 118 using conventional picking techniques as described above. In step 703, the main control engine 110 retrieves the object identifiers that correspond to the one or more selected objects as determined by the picking operation. In step 705, the main control engine 110, utilizing the graphics data stored the memory system 104, generates a list of markups that are associated with the selected objects. In step 707, the main control engine 110 may update the display parameters and/or attributes associated with the markups identified in the list generated in step 705. For example, the main control engine 110 may update the display attributes, such as color, of all markups not linked to the selected objects to make them hidden, thus controlling the graphics subsystem 112 to display only those markups linked to the selected objects in the graphics window of the display device 118. Moreover, the main control engine 110 may update display parameters to correspond to the markup linked to the selected objects. For example, the main control engine 110 may update the center of rotation of the scene (model) to correspond to the geometric center of the markups linked to the selected objects for subsequent processing, or may align the vertical axis of the markups linked to the selected objects with a preferred direction. Moreover, in step 709, the main control engine may control the graphics subsystem 112 to show the markups linked to the selected objects in the graphics window of the display device 118.

Moreover, as shown in FIG. 3, private text may be associated with one or more three-dimensional markups of the scene (model). In this case, a second annotation window may be provided that is similar to the annotation window described above with respect to FIGS. 4 and 5. However, in this case, the contents of the annotation text may be limited to relate to a single markup or a predefined group of markups. Furthermore, additional commands may be created that link the markups to text processing functions performed by the text processing subsystem 114 on the text that is displayed in the second annotation window. Such commands may be similar to the commands described above with respect to FIG. 7.

Figure 10:
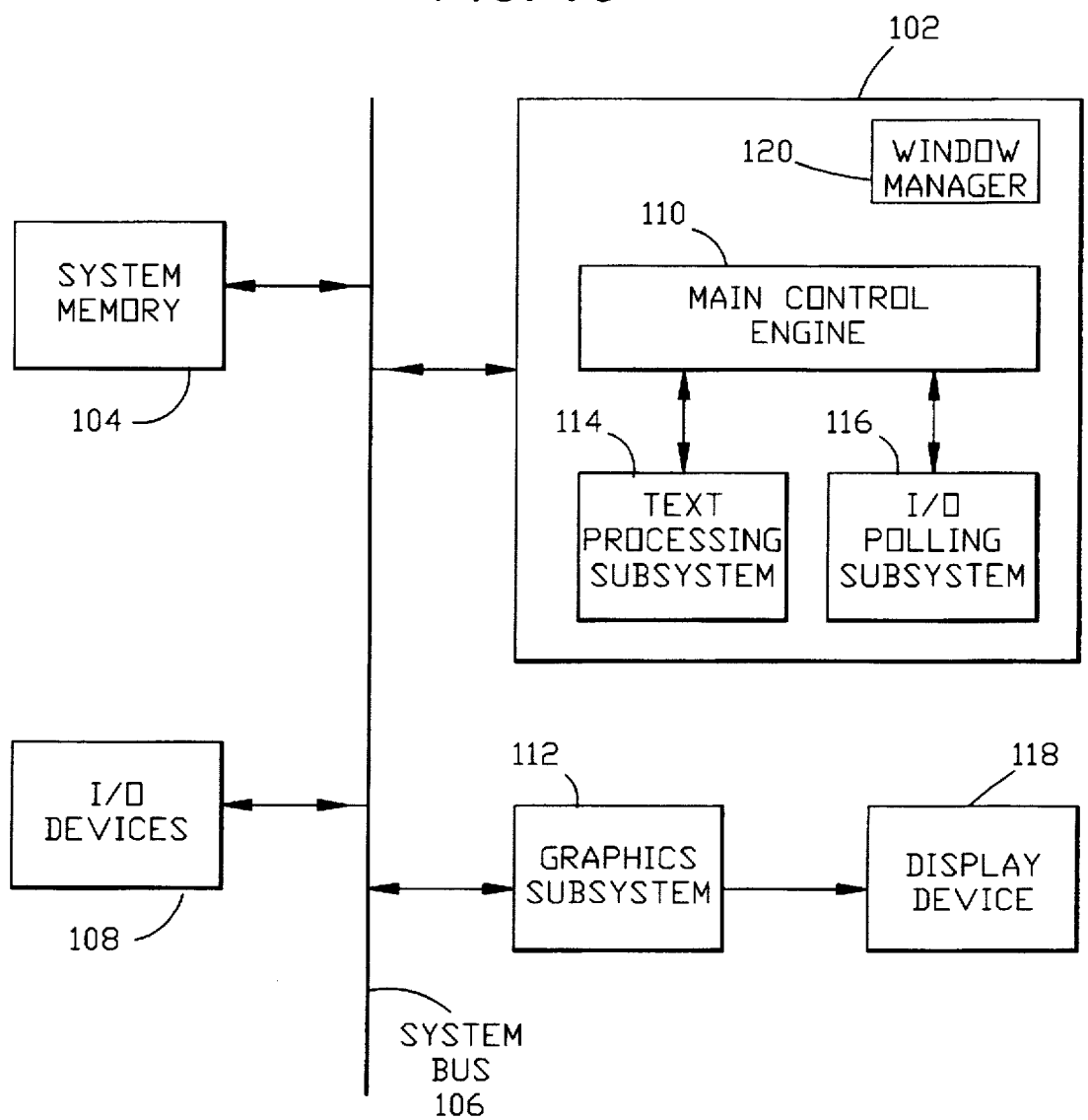
FIG. 10 is a functional block diagram of the architecture of the graphics system of the present invention wherein the graphics processing is implemented primarily in hardware.

As describe above, the graphics processing of the present invention is implemented primarily in software. However, the present invention is not limited in this respect. In an alternative embodiment, the graphics processing may be implemented primarily in hardware. FIG. 10 illustrates the architecture of the alternative embodiment. In this case, the operation of the graphics system as described above remains unchanged, however the functions of the graphics subsystem 112 are performed by dedicated hardware.

The graphics system of the present invention provides an efficient means for coupling geometric and non-geometric information related to a three-dimensional scene (model). Specifically, the graphics system provides the user with the capability of performing graphics function by invoking hotlinks in annotation text, thus minimizing the time to learn the techniques for navigating through the scene (model) presented by the graphics system. Moreover, the graphics system provides the user with the ability to search and locate annotation text related to a selected graphics element (e.g., object or markup). Importantly, the graphics system of the present invention may be used in several application domains, for example, engineering design and manufacture, architectural design and review, plant design, games, email and notes, and world wide web browsing.

Although the invention has been shown and described with respect to the particular embodiment(s) thereof, it should be understood by those skilled in the art that the foregoing and various other changes, omissions, and additions in the form and detail thereof may be made without departing from the spirit and scope of the invention.

We claim:

1. In a graphics system including a graphics processing engine for processing and displaying data representing three dimensional objects in a first portion of a display, a method of controlling operation of said graphics system comprising the steps of:

in response to user input, entering and displaying data in a second portion of said display, wherein said data includes a plurality of text strings and a plurality of symbols embedded within said text strings, wherein said symbols represent at least one hotlink command for controlling operation of said graphics processing engine;

in response to user selection of first data displayed in said second portion of said display, analyzing said first data to determine if said first data includes at least one symbol; and upon determining that said first data includes at least one symbol, identifying a first hotlink command represented by said at least one symbol included in said first data and controlling operation of said graphics processing engine to perform at least one graphics function according to said first hotlink command.

2. The method of claim 1, wherein said first data comprises at least one text string, and the step of analyzing said first data includes the step of parsing said at least one text string.

3. The method of claim 1, wherein said user selection is defined by a single predetermined user I/O event.

4. The method of claim 3, wherein said single predetermined user I/O event is a click of a pointing device on said at least one symbol.

5. The method of claim 1, wherein each symbol representing a hotlink command comprises at least one text string.

6. The method of claim 1, wherein said at least one graphics function is associated with at least one of said three-dimensional objects.

7. The method of claim 6, wherein said at least one graphics function updates display attributes associated with said at least one object.

8. The method of claim 6, wherein said graphics processing engine processes and displays said graphics data according to a view point; and wherein said at least one graphics function is one of updating said view point to correspond to a predefined view point associated with said at least one object and computing a new view point based upon an increment associated with said at least one object.

9. The method of claim 6, wherein said at least one graphics function is performing a predefined animation associated with said at least one object.

10. The method of claim 1, wherein said graphics processing engine processes and displays graphics data representing at least one three-dimensional markup in said first portion of said display; and wherein said at least one graphics function is associated with said at least one markup.

11. The method of claim 10, wherein said at least one graphics function updates display attributes associated with said at least one markup.

12. The method of claim 10, wherein said at least one graphics function updates display parameters associated with said at least one markup.

13. The method of claim 10, wherein said graphics processing engine processes and displays said graphics data according to a view point; and wherein said at least one graphics function is one of updating said view point to correspond to a predefined view point associated with said at least one markup and computing a new view point based upon an increment associated with said at least one object.

14. The method of claim 10, wherein said at least one graphics function is performing a predefined animation associated with said at least one markup.

15. The method of claim 1, wherein said graphics processing engine processes and displays said graphics data according to a view point; and wherein said at least one graphics function is updating said view point to correspond to a predefined view point associated with said first hotlink command.

16. The method of claim 1, wherein said at least one graphics function is performing a predefined animation associated with said first hotlink command.

17. The method of claim 1, wherein at least one text string and at least one symbol displayed in said second portion of said display is related to a first object of said objects displayed in said first portion of said display, the method further comprising the step of:

identifying one of said at least one text string and said at least one symbol related to said first object upon a user selecting said first object.

18. The method of claim 17, wherein said graphics processing engine processes and displays graphics data representing three-dimensional markups in said first portion of said display;

wherein said at least one text string and said at least one symbol displayed in said second portion of said display are related to a first markup of said markups displayed in said first portion of said display; and wherein one of said at least one text string and said at least one symbol related to said first markup is identified upon a user selecting said first markup.

19. A computer graphics system comprising:

a graphics processing engine for processing and displaying graphics data representing three-dimensional objects in a first portion of a display;

means, in response to user input, for entering, editing, and displaying in a second portion of said display a plurality of text strings and a plurality of symbols embedded within said text strings, wherein said symbols represent at least one hotlink command for controlling operation of said graphics processing engine;

means for analyzing said first data to determine if said first data includes at least one symbol, in response to user selection of first data displayed in said second portion of said display; and means for identifying a first hotlink command represented by said at least one symbol included in said first data and for controlling operation of said graphics processing engine to perform at least one graphics function according to said first hotlink command, upon determining that said first data includes at least one symbol.

20. The system of claim 19, wherein said first data comprises at least one text string, and said first data is analyzed by parsing said at least one text string.

21. The system of claim 19, wherein said user selection is defined by a single predetermined user I/O event.

22. The system of claim 21, wherein said single predetermined user I/O event is a click of a pointing device on said at least one symbol.

23. The system of claim 19, wherein each symbol representing a hotlink command comprises at least one text string.

24. The system of claim 19, wherein said at least one graphics function is associated with at least one of said three-dimensional objects.

25. The system of claim 24, wherein said at least one graphics function updates display attributes associated with said at least one object.

26. The system of claim 24, wherein said graphics processing engine processes and displays said graphics data according to a view point; and wherein said at least one graphics function is one of updating said view point to correspond to a predefined view point associated with said at least one object and computing a new view point based upon an increment associated with said at least one object.

27. The system of claim 24, wherein said at least one graphics function is performing a predefined animation associated with said at least one object.

28. The system of claim 19, wherein said graphics processing engine processes and displays graphics data representing at least one three-dimensional markup in said first portion of said display; and wherein said at least one graphics function is associated with said at least one markup.

29. The system of claim 28, wherein said at least one graphics function updates display attributes associated with said at least one markup.

30. The system of claim 28, wherein said at least one graphics function updates display parameters associated with said at least one markup.

31. The system of claim 28, wherein said graphics processing engine processes and displays said graphics data according to a view point; and wherein said at least one graphics function is one of updating said view point to correspond to a predefined view point associated with said at least one markup and computing a new view point based upon an increment associated with said at least one object.

32. The system of claim 28, wherein said at least one graphics function is performing a predefined animation associated with said at least one markup.

33. The system of claim 19, wherein said graphics processing engine processes and displays said graphics data according to a view point; and wherein said at least one graphics function is updating said view point to correspond to a predefined view point associated with said first hotlink command.

34. The system of claim 19, wherein said at least one graphics function is performing a predefined animation associated with said first hotlink command.

35. The system of claim 19, wherein at least one text string and at least one symbol displayed in said second portion of said display is related to a first object of said objects displayed in said first portion of said display, the system further comprising:

means for identifying one of said at least one text string and said at least one symbol related to said first object upon a user selecting said first object.

36. The system of 35, wherein said graphics processing engine processes and displays graphics data representing three-dimensional markups in said first portion of said display;

wherein said at least one text string and said at least one symbol displayed in said second portion of said display are related to a first markup of said markups displayed in said first portion of said display; and wherein one of said at least one text string and said at least one symbol related to said first markup is identified upon a user selecting said first markup.

* * * * *